UNITED STATES PATENT OFFICE.

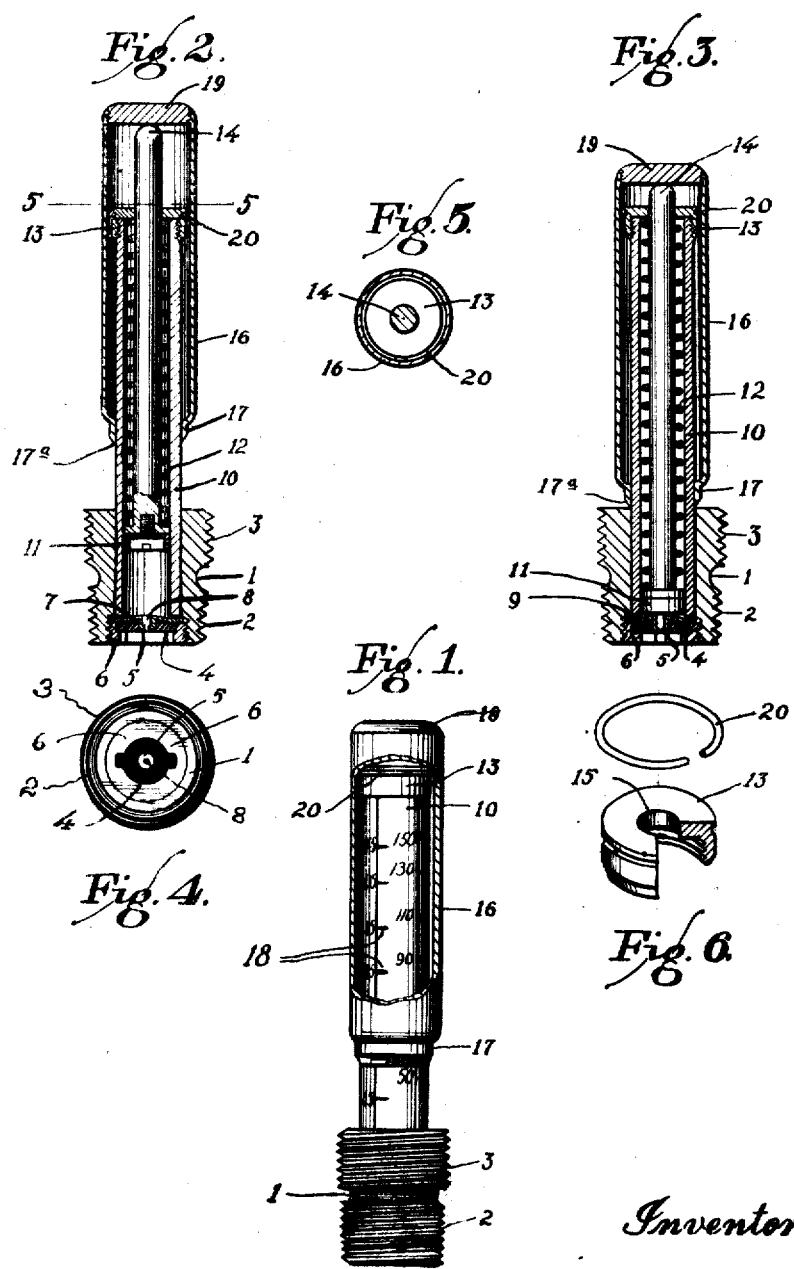

JOHN J. FITZGERALD, OF LOS ANGELES, CALIFORNIA.

GAGE DEVICE.

1,397,275.  Specification of Letters Patent.  Patented Nov. 15, 1921.

Application filed July 11, 1919. Serial No. 310,153.

*To all whom it may concern:*

Be it known that I, JOHN J. FITZGERALD, a citizen of the United States, residing at Los Angeles, in the county of Los Angeles and State of California, have invented new and useful Improvements in Gage Devices, of which the following is a specification.

The present invention relates to a pressure gage of that general type which are employed for the purpose of determining the fluid pressure in a container within which fluid is confined under pressure, the object of the invention being to provide such a device which embodies novel features of construction whereby it can be used to advantage either for measuring the air pressure in a pneumatic tire or for determining the compression in an engine cylinder.

Further objects of the invention are to provide a pressure gage of this character which is comparatively simple and inexpensive in its construction, which will accurately measure pressures throughout a wide range and can be used upon extra large sizes of tires and in connection with engine cylinders with the best of results, which is thoroughly dependable in its operation, and which is not liable to break or get out of repair.

With these and other objects in view the invention consists in certain arrangements and combinations of the parts which will be brought out more clearly as the description proceeds, the novel features thereof being specifically pointed out in the claims.

For a full understanding of the invention reference is to be had to the following description and accompanying drawing, in which:

Figure 1 is a side elevation of a combination tire and cylinder compression gage constructed in accordance with the invention, portions being broken away and shown in section to illustrate more clearly the details of construction;

Fig. 2 is a longitudinal sectional view through the gage with the plunger partially moved upwardly and against the action of the spring and the outer shell correspondingly elevated;

Fig. 3 is a similar view with the plunger entirely depressed and the outer shell completely telescoped upon the barrel;

Fig. 4 is a bottom plan view of the device;

Fig. 5 is a horizontal sectional view on the line 5—5 of Fig. 2; and

Fig. 6 is a detail view of the barrel cap and friction spring which engages the outer shell to hold it in position after it has been moved outwardly by the plunger.

Corresponding and like parts are referred to in the following description and indicated in all of the views of the drawing by like reference characters.

Referring to the drawing, which illustrates one particular embodiment of the invention, the numeral 1 designates a terminal head or body which has a tubular formation and is provided upon the exterior thereof with the two threaded portions 2 and 3. The diameter of the lower threaded portion 2 is less than that of the upper threaded portion 3, and these threaded portions are intended to engage the spark plug openings of engine cylinders of which it is desired to measure the compression. In actual practice there are two standard sizes of spark plug openings, and the smaller threaded portion 2 of the terminal head is of a proper size to engage the smaller size of spark plug opening, while the larger threaded portion 3 is of a proper size to engage the larger size of spark plug opening. The terminal head or body 1 of the pressure gage can thus be readily applied to the spark plug opening of almost any combustion engine that is liable to be encountered in actual practice.

The lower end of the bore of the terminal head 1 is enlarged to provide a suitable chamber within which a tire valve seat 4 and anvil or valve trip member 5 are arranged, said members being held in position by an interiorly rabbeted retaining ring 6 which is threaded in the said enlarged portion of the bore. The tire valve seat 4 may be in the form of a rubber washer member which will fit against and form a tight joint with the outer end of the tire valve casing in the usual manner. The anvil 5 is arranged at the center of the tire valve seat 4 for engagement with the stem of the tire valve to open the same when the gage is applied thereto, said anvil being carried by the plate 7 and being formed with the usual opening 8 through which the air or other fluid within the tire or engine cylinder can enter the interior of the gage and act upon the plunger thereof. A suitable packing 9 is illustrated as interposed between the back of the plate 7 and the shoulder at the base of the enlarged end of the bore of the terminal head, thereby insuring a fluid-tight joint. This tire valve seat and anvil may be of any conventional construction, and no claim to novelty is based thereon.

A cylinder 10 is fitted within the bore of the terminal head 1 and projects rearwardly from the terminal head, the inner end of the cylinder being shown as terminating flush with the seat at the base of the mouth or enlarged portion of the bore of the terminal head. A plunger 11 is slidably mounted within the cylinder or barrel, and a coil spring 12 is interposed between the plunger and a cap 13 at the upper end of the barrel to resist upward movement of the plunger within the barrel. A stem 14 extends upwardly from the plunger and passes slidably through an opening 15 in the cap 13, thereby serving to hold the plunger in proper position during its sliding movement, and also to position or center the spring. When the plunger 11 is at the lower limit of its movement it engages the plate 7 of the anvil 5.

An outer tubular shell 16 is mounted to telescope upon the barrel 10. The interior diameter of the outer shell 16 is greater than the exterior diameter of the barrel, thereby providing a space between the members, although the lower end of the outer shell 16 is contracted at 17 to closely engage the barrel, and said contracted portion terminates in a beveled edge 17$^a$ which is adapted to coöperate with graduations 18 on the barrel to indicate the fluid pressure within the tire or engine cylinder. The upper end of the outer shell 16 is closed, as indicated at 19, and this closed end is normally engaged by the upper end of the stem 14. It will also be noted that the edge portions of the cap 13 project laterally from the barrel and are grooved to receive a split spring ring 20, said spring normally tending to expand into a tight frictional engagement with the interior walls of the outer shell 16. The outer shell can thus be forcibly moved up and down upon the barrel, although the split spring ring 20 normally holds the same against accidental movement.

The position assumed by the parts before the gage is applied to a tire valve or an engine cylinder is indicated by Fig. 3, the outer shell 16 being completely telescoped upon the projecting portion of the barrel 10, the plunger 11 being at the lower limit of its movement, and the upper end of the stem 14 being in engagement with the closed end 19 of the shell 16. The pressure within the tire or engine cylinder will act upon the plunger 11 to move the same upwardly against the action of the coil spring 12, the extent of the movement depending upon the amount or degree of the pressure. The outer shell 16 will move outwardly upon the barrel 1 an amount corresponding to the movement of the plunger, since the outer end of the stem 14 pushes against the closed end 19 of the shell. As soon as the gage is removed from the tire valve, or the compression within the engine cylinder is released, the plunger 11 will be returned to its original position by the action of the spring 12. However, the outer shell 16 will be held in the position to which it was moved by the plunger, since it is frictionally engaged by the split spring ring 20 of the cap 13. The beveled lower edge 17$^a$ of the outer shell will then coöperate with the graduations 18 on the barrel to indicate the fluid pressure within the tire or engine cylinder to which the gage was applied. After a reading of the pressure has been made the outer shell 16 is manually moved back to its original position, after which the gage is ready for further use. It has been found that a gage constructed in this manner will measure with accuracy the high pressures which it is necessary to maintain in the large sizes of pneumatic tires; and that it can also be used with excellent results for measuring the compression of engine cylinders. One of the disadvantages of the tire pressure gages which have previously been in use has been that they give inaccurate readings at the higher pressures and are not at all dependable for measuring pressures above one hundred pounds to the square inch. This objection is eliminated by the present invention which will measure the higher pressure with accuracy.

The invention embodied in this application is an improvement upon the gage shown in my prior Patent, No. 1,347,022.

Having thus disclosed my invention, I claim and desire to secure by Letters Patent:

1. A pressure gage including a tubular terminal head having means at one end for detachably engaging an opening in a fluid pressure container, a valve-engaging seat thereon, a barrel projecting from the terminal head and having exterior graduations thereon, a cap applied to the outer end of the barrel, a plunger slidable within the barrel, a stem carried by the plunger and passing slidably through the cap, a spring interposed between the cap and the plunger, an outer tubular shell telescoping upon the barrel and movable outwardly by the stem, said shell then coöperating with the graduations on the barrel to indicate the pressure, and friction means carried by the before-mentioned cap for engaging the outer shell to hold it in an adjusted position when the plunger returns to the inner end of the barrel.

2. A pressure gage including a tubular terminal head having means at one end for detachably engaging an opening in a fluid pressure container, a valve-engaging seat thereon, a barrel projecting from the terminal head and having exterior graduations thereon, a cap applied to the outer end of the barrel and having a laterally projecting edge portion, a plunger yieldably mounted within the barrel, and movable outwardly by fluid pressure therein, a stem carried by the plunger and passing slidably through the cap, a tubular outer shell mounted to telescope upon the barrel and having an edge portion arranged to coöperate with the graduations thereon to indicate pressure, said shell being movable outwardly by engagement with the stem and an expansion spring carried by the edge portion of the cap for frictionally engaging the outer shell to hold the same in an adjusted position when the plunger returns to the inner end of the barrel.

3. A pressure gage including a tubular terminal head having means at one end for detachably engaging an opening in a fluid pressure container, a valve-engaging seat thereon, a barrel extended into the bore of the terminal head and also projecting from the terminal head, said barrel being formed with exterior graduations, a cap applied to the barrel, a plunger mounted within the barrel, a stem carried by the plunger and extending slidably through the cap, a spring interposed between the cap and the plunger, a tubular outer shell mounted to telescope upon the barrel and having an edge portion arranged to coöperate with the graduations of the barrel to indicate pressure, said shell being movable outwardly by engagement with the stem and an expansible spring carried by the before-mentioned cap and frictionally engaging the interior of the outer shell to hold the same in an adjusted position when the plunger returns to the inner end of the barrel.

4. A pressure gage including a tubular terminal head having means at one end for detachably engaging an opening in a fluid pressure container and having the bore thereof enlarged at its lower end, tire valve-engaging means fitted within the said enlarged portion of the bore, a barrel extending through the bore to the enlarged end portion thereof and also projecting from the terminal head, said barrel being formed with exterior graduations, a cap applied to the barrel, a plunger fitted within the barrel, a stem projecting from the plunger and passing slidably through the cap, a spring resisting outward movement of the plunger, a tubular outer shell mounted to telescope upon the barrel and having an edge portion adapted to coöperate with the graduations of the barrel to measure the pressure, said shell being movable outwardly by engagement with the stem and friction means carried by the before-mentioned cap for holding the outer shell in an adjusted position when the plunger returns to the inner end of the barrel.

5. A pressure gage including a barrel, means carried by the barrel for detachably engaging the opening of a fluid pressure container, a cap applied to the barrel, a plunger slidable within the barrel, a stem carried by the plunger and passing slidably through the cap, a spring resisting outward movement of the plunger, a tubular outer shell slidably mounted upon the barrel and arranged to be engaged and moved outwardly by the stem of the plunger, and friction means on the before-mentioned cap for holding the outer shell in an adjusted position when the plunger returns to the inner end of the barrel.

6. A pressure gage including a barrel, means carried by one end of the barrel for detachably engaging an opening in a fluid pressure container, a cap applied to the opposite end of the barrel and projecting laterally therefrom, a plunger slidable within the barrel, a stem carried by the plunger and extending slidably through the cap, a spring resisting outward movement of the plunger, a tubular outer shell mounted to telescope upon the barrel and engaged by the stem of the plunger to be moved thereby, and an expansible spring upon the laterally projecting edge portion of the cap for frictionally engaging the outer shell to hold the same in an adjusted position when the plunger returns to the inner end of the barrel.

7. A pressure gage including a barrel, means carried by one end of the barrel for detachably engaging an opening in a fluid pressure container, friction means at the opposite end of the barrel, a plunger slidable within the barrel, a spring resisting outward movement of the plunger, a stem carried by the plunger and adapted to be projected beyond the barrel when the plunger is moved outwardly, and a tubular shell mounted to telescope upon the exterior of the barrel and engaged by the stem of the plunger to be moved thereby, said tubular shell being also engaged by the before mentioned friction means upon the barrel so that it will be held in an adjusted position upon the barrel when the plunger returns to the inner end thereof.

In testimony whereof, I have signed my name to this specification in the presence of two subscribing witnesses.

JOHN J. FITZGERALD.

Witnesses:
MILDRED LEACH,
HUGH S. HILL.